United States Patent [19]
Holzapfel et al.

[11] Patent Number: 5,883,298
[45] Date of Patent: Mar. 16, 1999

[54] CONTROL DEVICE AND PROCESS FOR TESTING POSITION-DEPENDENT SIGNALS OF A POSITION MEASURING DEVICE

[75] Inventors: Wolfgang Holzapfel, Obing; Alois Huber, Nussdorf; Robert Bernhard, Garching/Alz, all of Germany

[73] Assignee: Dr. Johannes Heidenhain GmbH, Traunreut, Germany

[21] Appl. No.: 948,207

[22] Filed: Oct. 9, 1997

[30] Foreign Application Priority Data

Oct. 12, 1996 [DE] Germany ................ 196 42 200.0

[51] Int. Cl.$^6$ .................................. G01B 11/02
[52] U.S. Cl. ........................................... 73/1.79
[58] Field of Search .................. 73/1.79, 1.81; 324/202; 250/252.1; 356/243.1, 243.4; 33/706–708

[56] References Cited

U.S. PATENT DOCUMENTS

| | | | |
|---|---|---|---|
| 4,403,859 | 9/1983 | Ernst | 33/707 |
| 4,628,609 | 12/1986 | Rieder et al. | 33/707 |
| 4,654,527 | 3/1987 | Schmitt | 33/507 |
| 5,007,177 | 4/1991 | Rieder et al. | 33/708 |
| 5,128,609 | 7/1992 | Howley | |
| 5,241,173 | 8/1993 | Howley et al. | |

FOREIGN PATENT DOCUMENTS

| | | |
|---|---|---|
| 0 292 151 | 11/1988 | European Pat. Off. . |
| 0514081 B1 | 11/1992 | European Pat. Off. . |
| 0 555 507 | 8/1993 | European Pat. Off. . |
| WO 90/02956 | 3/1990 | WIPO . |

*Primary Examiner*—Robert Raevis
*Attorney, Agent, or Firm*—Brinks Hofer Gilson & Lione

[57] ABSTRACT

In the installation of a position measuring device it is necessary that parameters such as amplitude and phase position of the analog scanning signals as well as the position of the reference mark signal are tested. In order to accomplish such testing, a control device is provided that has a display field for visually indicating these parameters. A first bar is displayed in the display field and its width represents a measure for the fluctuation range of the radius and its position represents a measure for the average radius of a Lissajous figure. In addition, a marking is displayed for permissible fluctuation in range of this radius. Furthermore, a second bar is displayed in the display field, which indicates the position of the reference mark signal in relation to the analog signals generated by the scanner.

14 Claims, 6 Drawing Sheets

CONTROL DEVICE AND PROCESS FOR TESTING POSITION-DEPENDENT SIGNALS OF A POSITION MEASURING DEVICE

FIELD OF THE INVENTION

The invention relates to a control device and a process for testing position-dependent signals generated by a scanner of a position measuring device to ensure that the signals are accurately in a 90° phase relationship with respect to one another and that the signals have substantially the same amplitude.

BACKGROUND OF THE INVENTION

It is particularly important to test the signals generated by a scanner of a position measuring device in order to correctly install the scanner in the position measuring device. It is well known to provide a position measuring device having a scanner and scale to determine the position of a movable part, such as a machine, relative to a fixed part. Typically, the scanner outputs two signals in quadrature. These outputs can be input to further circuitry for counting the cycles of the incoming signals so as to determine position, to determine the direction of movement, and to provide position interpolation within one cycle of the output. It is desirable that the scanner be correctly installed relative to the scale so that the output signals from the scanner are accurately in quadrature with a 90° phase shift and have substantially the same amplitude. Signal quality and the precision of measurement depends greatly on the correct installation of the scanner relative to the scale. The amplitude of the signals generated by the scanner is influenced by the distance between the scanner and scale and the phase shift is influenced by the tilt of the scanner relative to the direction of measurement.

With incremental measuring systems, in addition to the incremental division, a reference mark or marks is placed on the scale. When the reference mark is scanned, an analog reference mark signal is generated which defines the reference mark's position. As a rule, with the appearance of the maximum of the reference mark signal, a stored absolute reference position is assumed by a counter and this assumed value is continuously updated by the incremental position measuring occurring during the relative movement between the scale and the scanner. Because an incremental counting step is only a fraction of a period of the scale, it is particularly important that the reference mark signal is associated as favorably as possible with a particular counting step, i.e., fraction of the period. This association is influenced considerably by the angular orientation of the scanner.

In order to test the correct installation of the scanner relative to the scale it is known to display the amplitude and phase shift of the analog signals generated by a scanner on an oscilloscope. The two analog signals output by the scanner are input to two channels of a double beam oscilloscope so that a Lissajous figure is generated. The radius of the Lissajous figure is a measure of the amplitudes as well as the phase relation of the analog signals. If the scanner is perfectly positioned with respect to the scale, the Lissajous figure will be a perfect circle centered at the origin.

In order to simplify the testing of the signals generated by a scanner, U.S. Pat. No. 5,128,609 discloses a control device having a bar display. In this control device, a radius of the Lissajous figure is calculated from the instantaneous amplitudes of the analog signals generated by a scanner and the instantaneous radius value is represented as a lighted point on the bar display. While this control device is easier to handle than an oscilloscope, the bar display does not provide sufficient resolution to allow one to make fine adjustments in the scanner's position.

During the installation of a scanner relative to a scale, the amplitudes of the analog signals generated by the scanner can range from zero to a maximum of, for example, 12 $\mu$A. This relatively large range must be able to be displayed in order for the analog signals to be tested. However, because of space limitations displaying such a large range compromises the resolution of the display. This has the disadvantage that the range of variation of the radius of the Lissajous figure cannot be represented with sufficient resolution and precision since the instantaneous radius value appears only as a single lighted point. In addition, there is no disclosure of testing a reference mark signal.

The RENISHAW company sells a control device for testing position-dependent scanning signals. This control device with the name RGSUE has features according to U.S. Pat. No. 5,128,609 described above. Furthermore, this control device has a display field for indicating the position of a reference mark. In the operating instructions, it is explained that the detection of the reference mark can be checked using the display. An adjusting screw is provided for adjusting the position of a reference mark. When the position of the reference mark is correctly adjusted, a green LED is illuminated on the display; when the position of the reference mark is incorrectly adjusted, a yellow or red LED is illuminated. This control device has the disadvantage that its ability to assist the operator in adjusting the scanner particularly during installation is insufficient. This disadvantage also applies to the device described in U.S. Pat. No. 5,241,173.

An object of the present invention is to provide a control device and a process for testing position-dependent analog signals where the parameters of the analog signals can be displayed with sufficiently high resolution and precision in order to make an adjustment of the scanning head easier for the operator.

An advantage of the present invention is that important parameters of the analog signals can be better recognized and thus, in a simple way, a good quality of analog signals can be obtained. Furthermore, the adjustment of the scanner is made easier during installation by virtue of the fact that the direction in which the scanning head should be moved and pivoted is also displayed.

SUMMARY OF THE INVENTION

According to a first aspect of the invention there is provided an apparatus for testing the position of a reference mark signal generated by a scanner in relation to analog signals generated by the scanner scanning a graduation track. The apparatus includes a control device coupled to the scanner which receives as inputs the analog signals and reference mark signal generated by the scanner wherein the control device calculates a position on a rising and a falling edge of the reference mark signal in relation to predetermined positions of the analog signals. A display coupled to the control unit displays whether the positions on the rising and falling edges of the reference mark signal are within a predetermined tolerance from the predetermined positions of the analog signals.

According to a second aspect of the invention there is a method for testing the position of a reference mark signal generated by a scanner in relation to the position of analog signals generated by the scanner scanning a graduation track. The method includes the steps of: a) calculating at least one position from the analog signals generated by the scanner from scanning the graduation track wherein the analog signals are phase shifted in relation to each other; b) calculating a position of a rising edge of the reference mark signal relative to the at least one calculated position in step (a); c) calculating a position of a descending edge of the reference mark signal relative to the at least one calculated position in step (a); d) displaying a first sign indicating whether the rising edge lies within a predetermined range determined by the phase shifted scanning signals; and e) displaying a second sign indicating whether the descending edge lies within a predetermined range determined by the phase shifted scanning signals.

According to a third aspect of the invention there is provided an apparatus for testing the position of a reference mark signal generated by a scanner in relation to analog signals generated by the scanner scanning a graduation track. The apparatus includes means for determining whether the zero crossings of the reference mark signal fall within a predetermined tolerance; and means for displaying a first symbol if the zero crossings fall within the predetermined tolerance indicating that the scanner is correctly installed or, a second symbol if the zero crossings do not fall within the predetermined tolerance indicating that the scanner has not been correctly installed.

According to a fourth aspect of the invention there is provided a method for testing the position of a reference mark signal generated by a scanner in relation to the position of analog signals generated by the scanner scanning a graduation track. The method includes the steps of: a) determining whether the zero crossings of the reference mark signal fall within a predetermined tolerance; b) displaying a first symbol if the zero crossing fall within the predetermined tolerance; and c) displaying a second symbol if the zero crossings fall within the predetermined tolerance.

DETAILED DESCRIPTION OF THE PRESENTLY PREFERRED EMBODIMENTS

Figure 1:
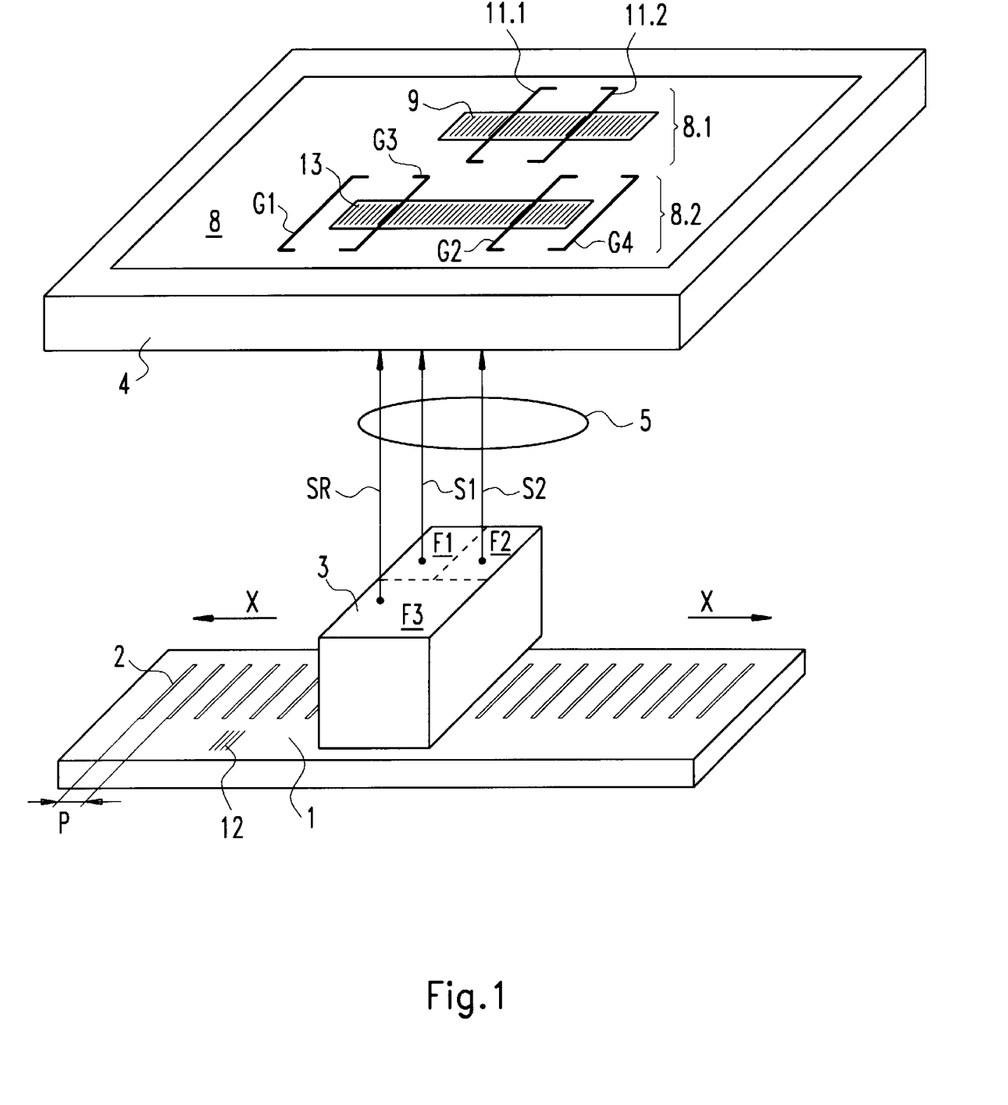
FIG. 1 is a schematic illustration of a position measuring system with a control device according to the invention.

FIG. 1 is a schematic illustration of a position measuring system having a control device according to a preferred embodiment of the present invention. The position measuring system includes a scale 1, a scanner 3 and a control device 4. The scale 1 has an incremental graduation 2 disposed thereon which has a graduation period P. The scale 1 also has a reference mark 12 disposed thereon. In a preferred embodiment the scale 1 and graduation 2 are designed to measure linear movement, however, angular movement may also be measured using a radial scale. The scanner 3 has scanning elements F1 and F2 that scan the incremental graduation 2 of the scale 1. The scanner also has a scanning element F3 that scans the reference mark 12. The scanning elements F1, F2, F3 may be optoelectric, magnetic, capacitive or inductive elements, for example. The control device 4 has a display field 8 on which bars 9, 13 and brackets 11.1, 11.2, G1–G4 can be displayed as will be described in greater detail hereinafter. The control device 4 and scanner 3 are coupled together by output lines 5.

Before any actual measurements are performed, the scanner 3 must be correctly installed. To that end the analog signals S1, S2 are input to the control unit 4 as will be described in detail hereinafter. After it has been determined that the scanner 3 has been correctly installed, position measuring can be performed by connecting the scanner 3 to an evaluation unit (not shown) which interpolates the analog signals S1, S2.

During the measurement operation, the scanning elements F1, F2 of the scanner 3 scan the incremental graduation 2 and output two analog signals S1, S2 that are preferably phase-shifted with respect to one another by 90° and preferably have substantially the same amplitude. These analog signals S1, S2 are interpolated in an interpolation unit (not shown) in order to obtain a position measuring value whose resolution is better than one period P of the incremental graduation 2 as is well known to those of ordinary skill in the art. In a preferred embodiment digital computers (not shown) are used to process the analog signals S1, S2. In order to obtain an interpolation with high precision it is necessary that the analog signals S1, S2 where S1=A1·sin (wt) and S2=A2·cos(wt) be phase-shifted exactly by 90° and have as high a signal amplitude A1, A2 as possible, and that the signal amplitudes of both analog signals are as nearly equal as possible. To ensure that these parameters are satisfied the scanner 3 must be correctly positioned with respect to the scale 2. Thus, during installation of the scanner, the analog signals generated by the scanner need to be tested. According to the present invention the control device 4 allows the parameters of the analog signals, i.e., phase shift and amplitude, to be displayed with high resolution so that fine adjustments in the scanner's position can be made.

Figure 2:
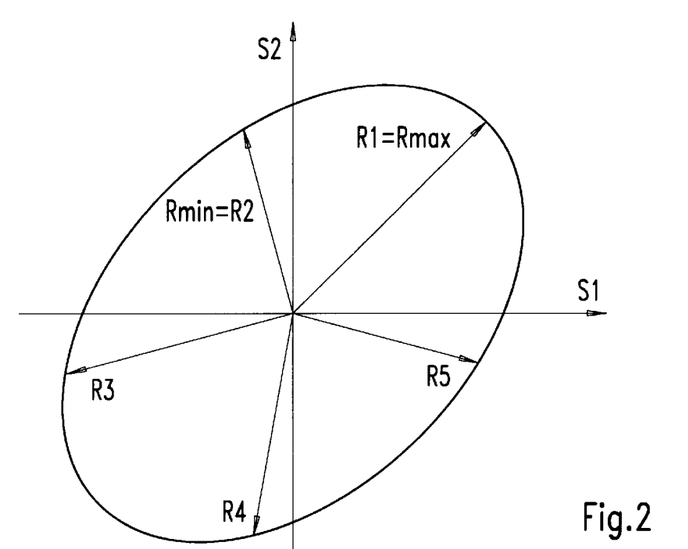
FIG. 2 shows a Lissajous figure.

FIG. 2 is a graph of a Lissajous figure illustrating the parameters, i.e., amplitude and phase, of the analog signals S1, S2. The instantaneous radius R1 to R5 of the Lissajous figure shown are calculated according to the following equation:

$$R_n = \sqrt{S1_n^2 + S2_n^2}, \text{ where } n=1, \ldots$$

After a predetermined number of radius values R1 to R5 have been calculated and stored, a minimum radius value $R_{min}$ and a maximum radius value $R_{max}$ are calculated. It is particularly advantageous if it is assured that the group of radius values R1 to R5 from which $R_{min}$ and $R_{max}$ are calculated have at least one radius value R within each of the four quadrants of the Lissajous figure. In order to monitor this, $R_{min}$ and $R_{max}$ may only be calculated if at least one radius value lies within a quadrant so that every quadrant has a radius value. If the scanner 3 is perfectly positioned With respect to the scale, the Lissajous figure will be a perfect circle of constant radius centered at the origin otherwise it will not have a constant radius as shown in FIG. 2.

Figure 3:
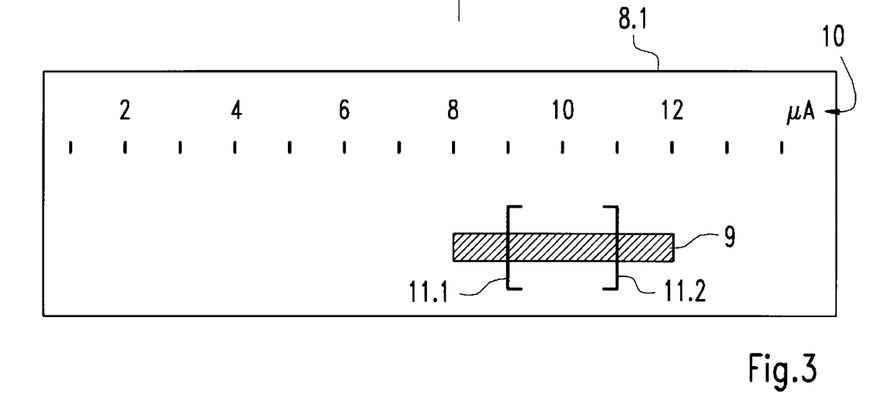
FIG. 3 shows a first example of a display region of the control device.

FIG. 3 illustrates an example of a display that can be displayed on the display field 8 of the control device 4. With a relative shift of the scanner 3 relative to the scale 1 in the direction of measurement X, several measured values for the radius R are determined in a predetermined time reference. For example, the control device 4 determines that $R_{min}$=8 μA and $R_{max}$=12 μA from these measured values. A continuous bar 9 extending from 8 μA to 12 μA is displayed in the display field 8 as shown. If $R_{min}$ and $R_{max}$ change in subsequent measurements, then the range of the bar 9 will also change. In a preferred embodiment, a measure 10 of possible radius values R is also displayed which ranges from 1 μA to 1 μA.

In a preferred embodiment it is also desirable to display a marking 11 in the form of brackets 11.1, 11.2, for indicating the theoretical width of the bar 9, i.e., the admissible tolerance of the range of variation of the radius value R. If, for example, the admissible tolerance is ±10%, then the left bracket 11.1 is displayed superimposed over the bar 9 at 9 μA, and the right bracket 11.2 is displayed superimposed over the bar 9 at 11 μA. Other markings instead of the brackets 11.1 and 11.2 may be used. The position of the brackets 11.1 and 11.2 are calculated according to the following formula:

a) An average value radius, RM, is calculated from several sequential radius values R. The average value RM can be the arithmetic mean of several radius values R, or the value $(R_{min}+R_{max})/2$. In the example shown in FIG. 4, RM=10. A marking, for example, a line, point, or arrow may also be included in the display field 8 to indicate the average value RM.

b) The position of the left bracket 11.1 is calculated assuming the admissible range of variation is 10% of RM where the left bracket 11.1 is positioned at the value RM−10% of RM. In the example shown in FIG. 4, where the average value RM equals 10 μA, the admissible range of variation of the radius value is R=±1 μA so that the left bracket 11.1 is shown at 9 μA and the right bracket 11.2 is shown at 11 μA.

Figure 4:
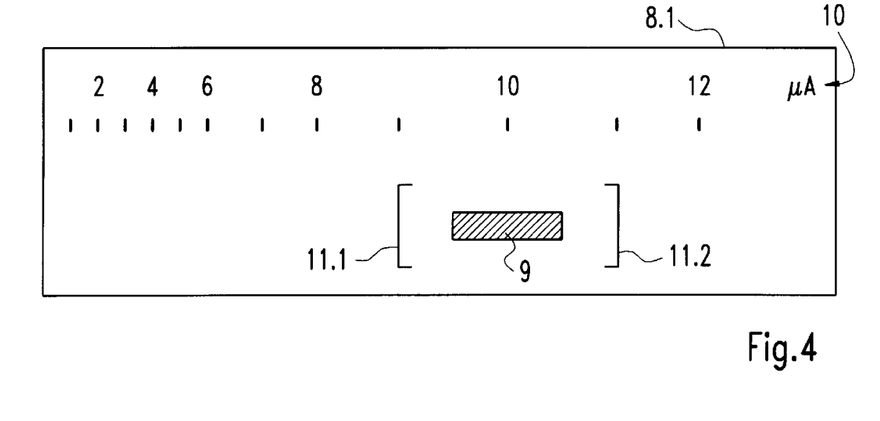
FIG. 4 shows a second example of a display region of the control device.

Since the admissible tolerance is determined as a % of RM, the range included between the right and left bracket 11.1, 11.2 changes as a function of the instantaneous average value RM.

During the testing of the position measuring apparatus, in particular during the installation of the scanner 3, the distance of the scanner 3 to the scale 1 as well as its angular alignment is correct if the bar 9 displayed in the display field 8 appears as far to the right of the display field 8 as possible and has a narrow width that lies within the brackets 11.1, 11.2.

In FIG. 4 a display field according to another preferred embodiment is shown. In this display field, the right hand portion of the measure 10 is exaggerated. In this example, the minimum and maximum range are well within the particularly important range of the theoretical value indicated by brackets 11.1, 11.2. This enlarged representation within a limited range simplifies the fine adjustment of the scanner 3. Small deviations and changes of the position of the bar 9 for example, at 10 μA are recognized more rapidly. In particular, the range of variation of the radius, thus the width of the bar, can be represented particularly clearly and thus equalization of the two amplitudes of the two sampling signals S1, S2 can be easily detected.

Figure 5:
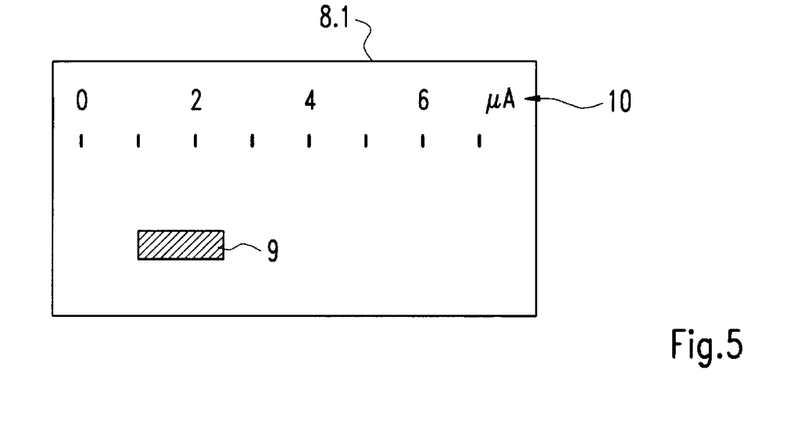
FIGS. 5 and 6 show two states of a third example of a display region of the control device.
Figure 6:
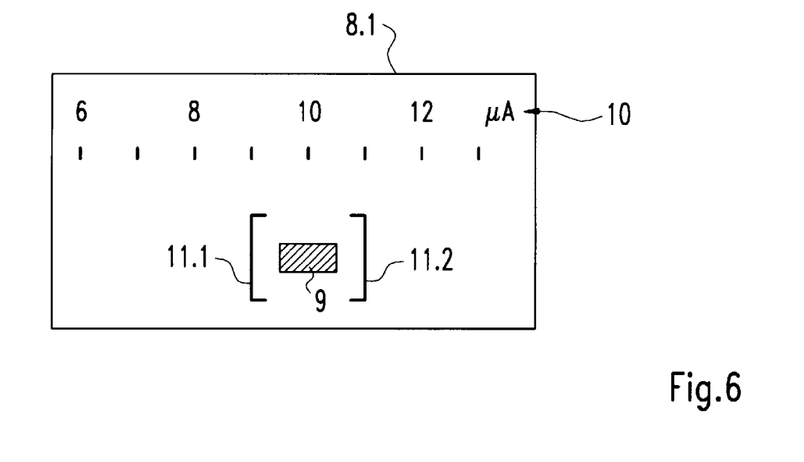

FIGS. 5 and 6 illustrate two states of a display field 8 of the control device according to another preferred embodiment of the invention. As shown in FIGS. 5 and 6, different smaller sections of the measure 10 are displayed. In FIG. 5 the measure 10 extends from 0–7 μA and in FIG. 6 the measure 10 extends from 7–13 μA. In order to accomplish this selectivity in the display, a switching unit (not shown) is provided in the control device 4. If it is determined that the maximum radius value $R_{max}$ lies below a limiting value of, for example, 7 μA, then a range of values from 0 to 7 μA is displayed in the display field 8 as the measure 10, as shown in FIG. 5. If it is determined that the minimum radius $R_{min}$ lies above a limiting value of, for example, 6 μA, then a range of values from 6 μA to 13 μA is displayed within the same display field 8 as shown in FIG. 6. In a preferred embodiment the switching of the display is essentially a function of the instantaneous position of the bar 9. The switching between displays can be performed as a function of the registered instantaneous values of R, as a function of $R_{min}$ or $R_{max}$ for several registered radius values R, or as a function of a calculated average value RM from several radius values. It is particularly advantageous if in the first state of the display (FIG. 6), a lower range of radius values is displayed in which the amplitudes of the sampling signals S1, S2 are insufficient and in the second state (FIG. 7) an upper range of radius values is displayed in which the amplitudes of the sampling signals S1, S2 have reached a sufficient value. In this second state the range of variation of the radius can then be observed and set particularly precisely in the display field 8. For this reason it is also possible that the measure 10 and the range of variation of the bar 9 in the second state with respect to the first state is shown enlarged.

In all of the preferred embodiments, it is also possible that the range of variation, i.e., the width of the bar 9, can be shown enlarged with respect to its position because it is especially important that the range of variation be as small as possible. In an example explained this means that for determined radius values $R_{min}$=9 μA and $R_{max}$=11 μA, the average value RM=10 μA is calculated and the average position of the bar 9 is also represented at 10 μA. The enlarged representation of the range of variation is realized by the width of the bar 9 being shown wider, perhaps by a factor of 2, thus the left end is located at RM−2(RM−$R_{min}$) =8 μA and the right end is located at RM+2($R_{max}$−RM)=12 μA.

As described with reference to the three examples of the display fields 8 shown in FIGS. 4–7, the width of the bar 9 represents the deviation between several radius values R. This deviation can be the difference between $R_{min}$ and $R_{max}$ or, for example, the standard deviation between several radius values R.

The bar 9 can also be displayed without the specification of measure 10 so that the operator only has to take care that the bar 9 is as narrow as possible and comes to rest as far to the right as possible.

Alternatively, the bar 9 can also be displayed in a way that its position in one direction of the display field 8 specifies the average radius RM and, in a direction perpendicular thereto, the bar 9 has a width that specifies the range of variation of the radius R.

In the installation of the scanner 3 it has been shown that it is advantageous if for coarse adjustment of the scanner 3 the bar 9 is displayed as rapidly as possible and for fine adjustment of the scanner the bar 9 is shown as precisely as possible. For this reason it is preferred that the range of variation at radius values below a predetermined value, for example 50% of the theoretical value, is calculated from a smaller number of radius values (for example, 5 values) and above this predetermined value from a larger number of radius values (for example, 20 values).

A reference mark 12 is also disposed on the scale 1 as shown in FIG. 1. In a preferred embodiment the reference mark 12 is formed by an irregular series of lines as is well known. When the reference mark 12 is scanned with the scanning element F3, a reference mark signal SR is produced. It is desirable that the amplitude of the reference mark signal SR be as large as possible. In a preferred embodiment the reference mark 12 is placed on the scale 1 using a photo-lithographic process.

Figure 7:
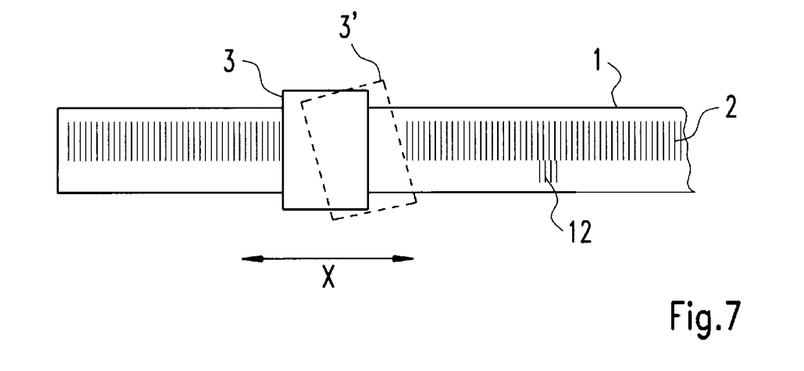
FIG. 7 shows two positions of a scanning head.
Figure 8:
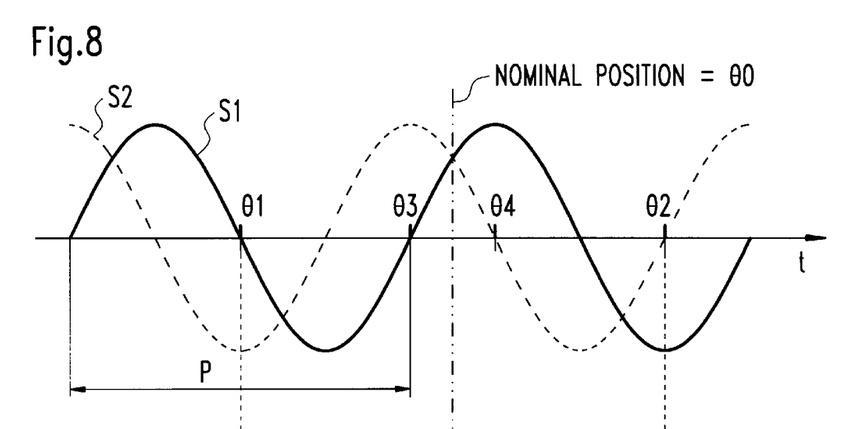
FIG. 8 shows two scanning signals that are phase shifted by 90°.
Figure 9:
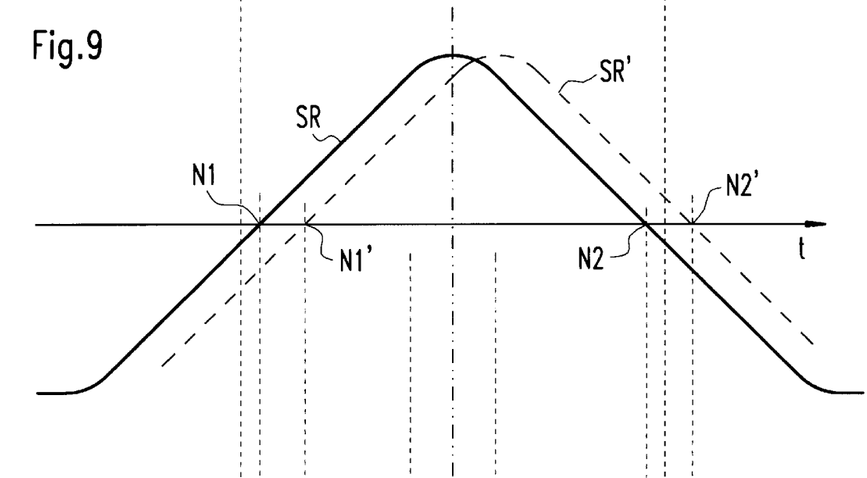
FIG. 9 shows a reference mark signal.

The reference mark 12 has a position associated with a predetermined range of a particular graduation period of the division 2, which results during the manufacture of the scale 1. In order to be sure that the scanner is correctly installed, it needs to be tested whether the reference mark signal SR has a certain position with respect to the analog signals S1, S2. The position of the reference mark RS with respect to the analog signals S1, S2 changes as the scanner is tilted because the graduation 2 which is scanned for generating analog signals S1, S2 is spaced apart from the location of the reference mark 12. In order to explain this reference will be made to FIGS. 7–9. In FIG. 7 the scanner 3 is shown in two positions in correct alignment (solid line) and in a tilted position (dashed lines). FIG. 8 is a graph of the analog signals S1, S2. For ease of explanation, it is assumed that the analog scanning signals S1, S2 shown in FIG. 8 do not change. FIG. 9 is a graph showing the reference mark signal SR when the scanner 3 is in correct alignment (solid line) and the reference mark signal SR' when the scanner 3 is tilted (dashed line). The desired position of the maximum of the reference mark signal with relation to the analog signals S1, S2 is indicated by the line labeled Nominal Position=Θ0. It can be seen that when the scanner 3 is in correct alignment the reference mark signal SR is symmetrical about the nominal position=Θ0. When the scanner 3 is tilted the maximum of reference mark, signal SR' is not symmetrical about the nominal position=Θ0.

In order to facilitate the correct alignment of the scanner 3 for the operator, a second display region 8.2 is provided on the display field 8 shown in FIG. 1. When the scanner 3 moves with relation to the scale 1 in the measurement direction X, the position of the reference mark signal SR is determined and stored in memory (not shown). The position indicated is consequently available to the user for analysis even after the reference mark 12 has been passed by. The range B1 shown in FIG. 10 of the reference mark signal SR is displayed in the form of a bar 13 in display region 8.2. The position of the reference mark signal SR is represented by the position of the bar 13 inside the second display region 8.2 of the display field 8.

Figure 11:
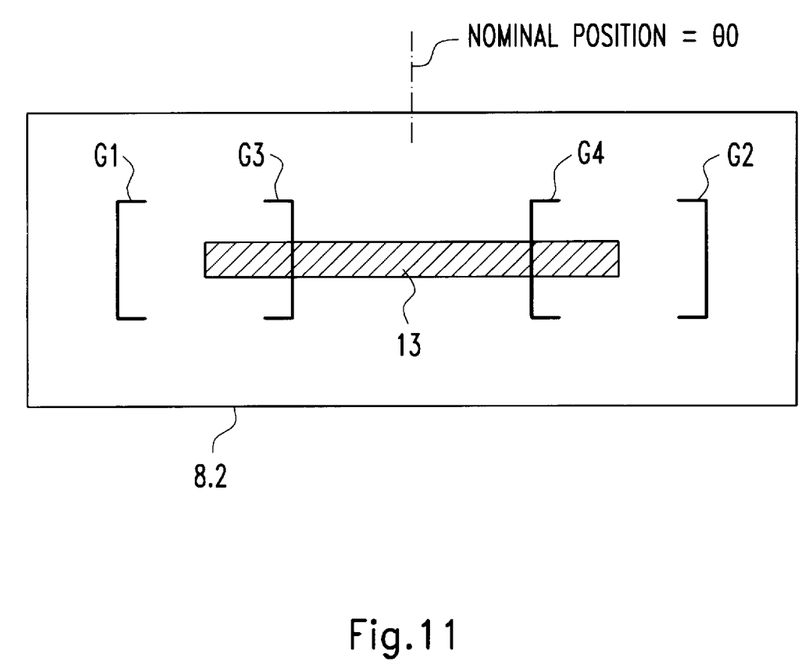
FIG. 11 shows a display region of the control device that is for depicting the position of the reference mark signal.
Figure 12:
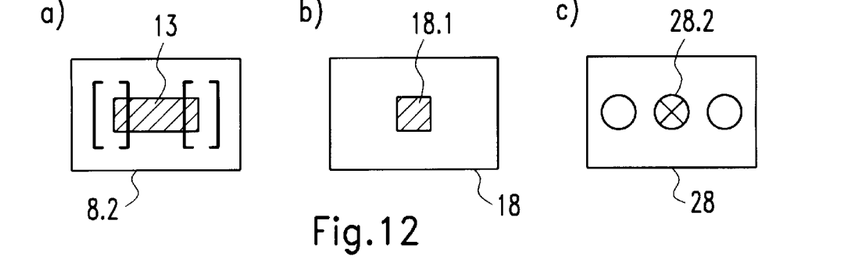
FIGS. 12 to 15 show a number of states of different display devices.
Figure 13:
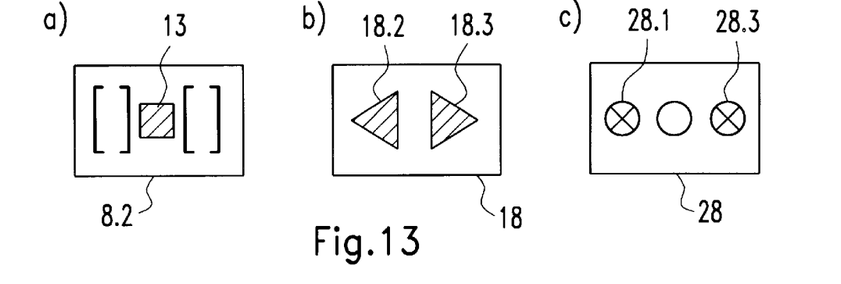
Figure 14:
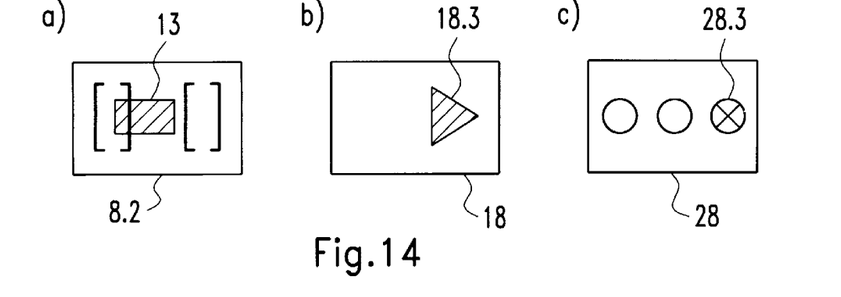
Figure 15:
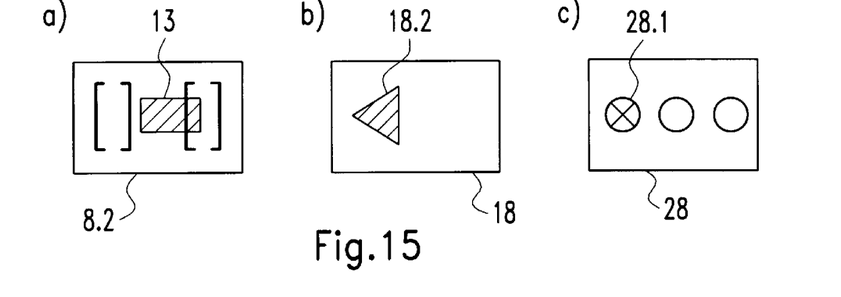

FIG. 11 is an exploded view of display region 8.2. The nominal position=Θ0 is shown in a dashed line and may be displayed by a marking. To determine the relative position of the zero passages N1 and N2 of the reference mark signal SR, the spacing between the nominal position=Θ0 and N1 as well as the spacing between the nominal position=Θ0 and N2 is determined. The zero passages N1, N2 are determined by comparing the reference mark signal SR to a predetermined threshold. In the example shown, the predetermined threshold is the time axis t. This determination can be calculated from a time measurement or from the amplitude values of the scanning signals S1, S2. The time measurement is carried out in such a way that a counter receives a high cycle frequency and its settings are determined at the time N1 as well as Θ0 and N2. The width can be determined from a comparison of the counter settings that have been registered at N1 and N2, the left edge of the bar 13 can be determined from a comparison of the counter settings that have been registered at N1 and Θ0, and the right edge of the bar 13 can be determined from a comparison of the counter settings that have been registered at N2 and Θ0. Alternatively, the width and the position of the bar 13 can be determined from the amplitude values of the analog signals S1, S2 at Θ0, N1, and N2. Use is made of the fact that the ratio of the, amplitude values clearly determines the absolute position within a period P.

In a preferred embodiment, admissible regions B4, B5 (FIG. 10) are designated for the zero crossings of the reference mark signal. The limits of these regions B4, B5 are defined by analog signals S1, S2. In a preferred embodiment, the left zero passage N1 of the reference mark signal SR should occur in the region B4 between Θ0 and Θ3 and the right zero passage N2 of the reference mark signal SR should occur in the region B5 between Θ4 and Θ2. The limits of these regions B4, B5 are shown in the display field 8.2 as markings G1 to G4. The above-described time measurement between positions Θ1, N1, Θ3, Θ4, N2, and Θ2 or amplitude measurements can be used to determine the position and width of the bar 13 in relation to these predetermined phase positions Θ1 to Θ4 and consequently in relation to the markings G1 to G4.

Figure 10:
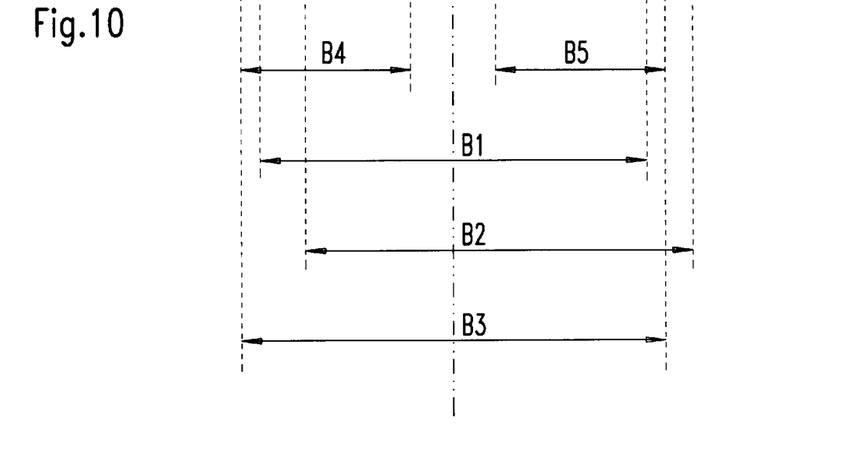
FIG. 10 shows different regions of the scanning signals and of the reference mark signal.

In FIG. 10, B1 represents a region between the zero crossings N1 and N2 of reference mark signal SR, which determines the width of the bar 13. B2 represents a region between the zero crossings N1' and N2' of the reference mark signal SR' when the scanner 3' is tilted. B3 represents the region between the permissible limits Θ1 and Θ2.

The position of the bar 13 can also be indicated in the display region 8.2 independent of the current movement direction of the scanner 3 in relation to the scale 1. This means that the right end of the bar 13 indicates the position of the right region of the reference mark 12 independently of the movement direction and the left end of the bar 13 indicates the position of the left region of the reference mark 12. This is achieved by virtue of the fact that the movement direction of the scanner 3 is detected and, independently of this, N1 is indicated as the right or left edge of the bar 13 and N2 is indicated as the left or right edge of the bar 13. For example, with a positive movement direction, the bar 13 is consequently detected and displayed in accordance with the manner described in FIGS. 8 to 10. However, if a negative movement direction is detected, the zero passages N1, N1' and N2, N2' are displayed in reverse order. A clear and correct positional association is consequently obtained from the chronological association.

FIGS. 12 to 15 show different display fields for depicting the position of the reference mark signal SR.

FIG. 12a illustrates the display region 8.2 of the display field 8 when the scanner 3 is in correct alignment having both ends of the bar 13 within permissible ranges B4, B5. This correct position can also be represented by a different sign such as that shown in FIG. 12b where a centrally illuminating region 18.1 of a display unit 18 is used. Alternatively, a centrally illuminating LED 28.2 of an LED strip 28 can be used as shown in FIG. 12c.

FIG. 13a illustrates the display region 8.2 when the scanner 3 is not in proper alignment and the position of the zero passages N1, N2 lies outside the permissible ranges B4, B5. If this state is detected, then this can alternatively be indicated by a sign shown in FIG. 13b, e.g., in the form of arrows 18.2 and 18.3. Alternatively, two LEDs 28.1 and 28.3 of the LED strip 28 may be illuminated as shown in FIG. 13c.

FIG. 14a illustrates the display region 8.2 with a position of the zero passage N2 outside the permissible range B5. In order to indicate to the operator, even with a very small display, which range B5 or B4 there is an incorrect alignment in and to indicate the direction for the correction of this incorrect alignment, this is indicated in the display unit 18 by means of a rightward pointing arrow 18.3 (FIG. 14*b*) and with the LED strip 28 by means of the LED 28.3 that illuminates on the right. If an opposite incorrect alignment is detected, the display units 8.2, 18, and 28 are operated in accordance with the FIGS. 15*a*, 15*b*, and 15*c*.

Of course, various combinations of the examples can be realized.

In a preferred embodiment the display fields 8 and 18 are preferably liquid crystal displays, i.e., LCDs, however, fluorescent displays, LED strips, or LED matrices may be used.

The control device with the display field can also be an integral component of the scanner 3 itself so that the bar is displayed on a face of the scanner 3. It is particularly advantageous if the position of the reference mark signal SR is displayed on the scanner 3 itself. This display can be carried out in particular with display units according to FIGS. 12 to 15.

Particular regions or values can also be represented with different colors in the display field.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. An apparatus for testing the position of a reference mark signal generated by a scanner in relation to analog signals generated by the scanner scanning a graduation track, the apparatus comprising:

a control device coupled to the scanner wherein the control device receives as inputs the analog signals and reference mark signal generated by the scanner wherein the control device calculates a position on a rising and a failing edge of the reference mark signal in relation to predetermined positions of the analog signals; and a display coupled to the control unit for displaying whether the positions on the rising and falling edges of the reference mark signal are within a predetermined tolerance from the predetermined positions of the analog signals.

2. An apparatus according to claim 1 wherein the position of the reference mark signal is represented as a bar on the display having one end of the bar located at the position of the rising edge and the other end of the bar located at the position of the descending edge of the reference mark signal.

3. An apparatus according to claim 1, further comprising markings displayed on the display, which define the predetermined tolerance for the rising edge and the descending edge of the reference mark signal.

4. An apparatus according to claim 1 further comprising a first and a second symbol which can be displayed on the display, wherein the first symbol is displayed when the rising edge of the reference mark signal lies outside the predetermined tolerance and the second symbol is displayed when the descending edge of the reference mark signal lies outside the predetermined tolerance.

5. An apparatus according to claim 1 wherein the display is a liquid crystal display.

6. An apparatus according to claim 1 wherein the display is located on the scanner.

7. A method for testing the position of a reference mark signal generated by a scanner in relation to the position of analog signals generated by the scanner scanning a graduation track, the method comprising the steps of:

a) calculating at least one position from the analog signals generated by the scanner from scanning the graduation track wherein the analog signals are phase shifted in relation to each other;

b) calculating a position of a rising edge of the reference mark signal relative to the at least one calculated position in step (a);

c) calculating a position of a descending edge of the reference mark signal relative to the at least one calculated position in step (a);

d) displaying a first sign indicating whether the rising edge lies within a predetermined range determined by the phase shifted scanning signals; and e) displaying a second sign indicating whether the descending edge lies within a predetermined range determined by the phase shifted scanning signals.

8. An apparatus for testing the position of a reference mark signal generated by a scanner in relation to analog signals generated by the scanner scanning a graduation track, the apparatus comprising:

means for determining whether the zero crossings of the reference mark signal fall within a predetermined tolerance;

means for displaying a first symbol if the zero crossings fall within the predetermined tolerance indicating that the scanner is correctly installed or, a second symbol if the zero crossings do not fall within the predetermined tolerance indicating that the scanner has not been correctly installed.

9. An apparatus according to claim 8 wherein the second symbol indicates what corrective action needs to be taken to correctly install the scanner.

10. An apparatus according to claim 8 wherein the means for displaying is a liquid crystal display.

11. An apparatus according to claim 8 wherein the means for displaying is a plurality of LEDs.

12. An apparatus according to claim 8 wherein the second symbol is an arrow pointing in the direction in which the scanner should be moved.

13. An apparatus according to claim 8 wherein the means for displaying is located on the scanner.

14. A method for testing the position of a reference mark signal generated by a scanner in relation to the position of analog signals generated by the scanner scanning a graduation track, the method comprising the steps of:

a) determining whether the zero crossings of the reference mark signal fall within a predetermined tolerance;

b) displaying a first symbol if the zero crossing fall within the predetermined tolerance;

c) displaying a second symbol if the zero crossings fall within the predetermined tolerance.

* * * * *

UNITED STATES PATENT AND TRADEMARK OFFICE
CERTIFICATE OF CORRECTION

PATENT NO.   : 5,883,298
DATED        : March 16, 1999
INVENTOR(S)  : Wolfgang Holzapfel et al.

It is certified that error appears in the above-identified patent and that said Letters Patent is hereby corrected as shown below:

In the Claims

In claim 1, line 9, please change "failing" to --falling--.

Signed and Sealed this

Twenty-ninth Day of May, 2001

*Attest:*

NICHOLAS P. GODICI

*Attesting Officer*    *Acting Director of the United States Patent and Trademark Office*